(12) United States Patent
Tomita et al.

(10) Patent No.: US 9,656,920 B2
(45) Date of Patent: May 23, 2017

(54) CERAMIC MATERIAL AND THERMAL SWITCH

(71) Applicant: NGK INSULATORS, LTD., Aichi-prefecture (JP)

(72) Inventors: Takahiro Tomita, Nagoya (JP); Kenkichi Nagai, Nagoya (JP); Hiroharu Kobayashi, Nagoya (JP)

(73) Assignee: NGK INSULATORS, LTD., Aichi-Prefecture (JP)

( * ) Notice: Subject to any disclaimer, the term of this patent is extended or adjusted under 35 U.S.C. 154(b) by 0 days.

(21) Appl. No.: 15/001,541

(22) Filed: Jan. 20, 2016

(65) Prior Publication Data

US 2016/0137555 A1    May 19, 2016

Related U.S. Application Data

(63) Continuation of application No. PCT/JP2014/072936, filed on Sep. 1, 2014.

(30) Foreign Application Priority Data

Sep. 2, 2013  (JP) ................................. 2013-181649

(51) Int. Cl.
*C04B 35/565* (2006.01)
*C04B 35/584* (2006.01)
(Continued)

(52) U.S. Cl.
CPC .......... *C04B 35/584* (2013.01); *C04B 35/565* (2013.01); *C04B 35/575* (2013.01);
(Continued)

(58) Field of Classification Search
CPC ... C04B 35/565; C04B 35/571; C04B 35/573; C04B 35/575
See application file for complete search history.

(56) References Cited

U.S. PATENT DOCUMENTS 3,520,656 A * 7/1970 Yates ...................... C01B 31/36
                                                    423/345
4,295,890 A * 10/1981 Stroke ..................... C01B 31/36
                                                    264/676
(Continued)

FOREIGN PATENT DOCUMENTS

JP      01-230479 A     9/1989
JP      2004-035327 A   2/2004
(Continued)

OTHER PUBLICATIONS

Hamano, K., "Fine Ceramics Handbook," Feb. 10, 1984, pp. 567-570, Asakura Publishing Co., Ltd.
(Continued)

*Primary Examiner* — Noah Wiese
(74) *Attorney, Agent, or Firm* — Cermak Nakajima & McGowan LLP; Tomoko Nakajima (57) ABSTRACT

A ceramic material has a characteristic length $L_a$ of a micro-structure thereof that satisfies $0.1\ L_{AMFP} \le L_a \le 100\ L_{AMFP}$, and has thermal conductivity that monotonously increases from room temperature to 100° C., where $L_{AMFP}$ denotes apparent mean free path of phonons at room temperature, and is defined as $L_{AMFP}=(3 \times \text{thermal conductivity})/(\text{heat capacity} \times \text{speed of sound})$. The characteristic length $L_a$ of the micro-structure is an interval between particles of different type of material when the ceramic material includes a composite material in which the different type of material is dispersed in a base material, is an interval between one pore and another pore when the ceramic material includes a porous body, and is the crystalline particle size (interval between one grain boundary and another grain boundary) when the ceramic material includes a polycrystalline body.

13 Claims, 2 Drawing Sheets

(51) Int. Cl.
*C04B 35/581* (2006.01)
*C04B 35/575* (2006.01)
*H01H 37/32* (2006.01)
*C04B 38/00* (2006.01)

(52) U.S. Cl.
CPC .......... C04B 35/581 (2013.01); C04B 38/008 (2013.01); H01H 37/32 (2013.01); *C04B 2235/3213* (2013.01); *C04B 2235/3217* (2013.01); *C04B 2235/3225* (2013.01); *C04B 2235/5445* (2013.01); *C04B 2235/5454* (2013.01); *C04B 2235/666* (2013.01); *C04B 2235/781* (2013.01); *C04B 2235/85* (2013.01); *C04B 2235/9607* (2013.01)

(56) References Cited

U.S. PATENT DOCUMENTS

| | | | | |
|---|---|---|---|---|
| 5,591,685 | A * | 1/1997 | Mitomo | C04B 35/575 501/88 |
| 6,090,733 | A * | 7/2000 | Otsuki | C04B 35/575 252/516 |
| 9,388,084 | B2 * | 7/2016 | Rossiquet | C04B 35/575 |
| 2004/0232893 | A1 | 11/2004 | Odagawa et al. | |
| 2007/0069192 | A1 | 3/2007 | Odagawa et al. | |
| 2007/0240749 | A1 | 10/2007 | Ohtaki | |
| 2008/0121849 | A1 | 5/2008 | Mikami et al. | |
| 2008/0258690 | A1 | 10/2008 | Odagawa et al. | |
| 2010/0065263 | A1 * | 3/2010 | Tanchon | B64G 1/58 165/277 |
| 2011/0133203 | A1 | 6/2011 | Werne et al. | |
| 2014/0035715 | A1 | 2/2014 | Takahashi et al. | |

FOREIGN PATENT DOCUMENTS

| | | |
|---|---|---|
| JP | 2008-016474 A | 1/2008 |
| JP | 2008-292402 A | 12/2008 |
| WO | WO2004/068604 A1 | 8/2004 |
| WO | WO2005/091393 A1 | 9/2005 |
| WO | WO212/140927 A1 | 10/2012 |

OTHER PUBLICATIONS

Oh, D.-W., et al., "Thermal conductivity and dynamic heat capacity across the metal-insulator transition in thin film VO2," Appl. Phys. Lett. 2010;96:151906.

International Search Report and Written Opinion for PCT Patent App. No. PCT/JP2014/072936 (Nov. 25, 2014) with English translation of the Search Report.

Extended European Search Report for European Patent App. No. 14839940.5 (Mar. 27, 2017).

* cited by examiner

CERAMIC MATERIAL AND THERMAL SWITCH

TECHNICAL FIELD

The present invention relates to a ceramic material having heat-transfer performance that changes with temperatures, and a thermal switch including the same.

BACKGROUND ART

Effective use of thermal energy has been recently demanded to control $CO_2$ emission and solve energy issue, for example. Since heat is necessary in some cases and is not necessary in other cases, a technique to control the flow of heat, if any, will lead to the effective use of heat.

As such techniques, Patent Document 1 discloses an element to switch thermal conductivity by applying energy (magnetic field, electric field, light and the like) to a transition body sandwiched between electrodes, and Patent Document 2 discloses a switch to switch states between a connected state in which a first member is in contact with a second member having a carbon nanotube layer and an unconnected state in which they are not in contact. Non-Patent Document 1 reported about $VO_2$ in which insulator-metal transition occurs, as one example of electronic phase transition, and reported that thermal conductivity of $VO_2$ increases by 60% when its temperature exceeds about 70° C. that is a transition temperature.

CITATION LIST

Patent Documents

[Patent Document 1] WO 2004/068604
[Patent Document 2] WO 2012/140927

Non Patent Document

[Non Patent Document 1] "Thermal conductivity and dynamic heat capacity across the metal-insulator transition in thin film $VO_2$", Dong-Wook Oh, Changhyun Ko, Shriram Ramanathan, and David G. Cahill, Applied Physics Letters, 96, 151906(2010)

SUMMARY OF THE INVENTION

Problem to be Solved by the Invention

In Patent Document 1, however, electrodes and wiring are required to apply energy for switching. In Patent Document 2, another element is required in addition to the element whose thermal conductivity changes, and includes an actuator to change the connection state. Therefore the switch increases in size, and the switch has to be installed at a limited position from the viewpoint of heat resistance property. Further it is difficult to manufacture a switch of a complicated shape.

In the case of electronic phase transition, a variation in thermal conductivity is small (from 3.5 W/(m·K) to 5.5 W/(m·K) for $VO_2$ (Non-Patent Document 1)), from which characteristics enabling switching between heat dissipation and heat insulation cannot be obtained.

The present invention aims to provide a ceramic material having heat-transfer performance that can change with temperatures, and a thermal switch including the same.

Means for Solving the Problem

The present inventors found that the aforementioned problems can be solved by controlling the characteristic length of the micro-structure of a ceramic material. That is, the present invention provides the following ceramic material and thermal switch.

A ceramic material having a characteristic length $L_a$ of a micro-structure thereof that satisfies $0.1\ L_{AMFP} \leq L_a \leq 100\ L_{AMFP}$, and having thermal conductivity that monotonously increases from room temperature to 100° C., where $L_{AMFP}$ denotes apparent mean free path of phonons at room temperature, and is defined as $L_{AMFP}=(3\times\text{thermal conductivity})/(\text{heat capacity}\times\text{speed of sound})$.

The ceramic material according to [1], wherein thermal conductivity thereof at 100° C. is 1.5 times or more of thermal conductivity at room temperature.

The ceramic material according to [1] or [2], wherein thermal conductivity thereof at 200° C. is 2 times or more of thermal conductivity at room temperature.

The ceramic material according to any one of [1] to [3], wherein the ceramic material includes a composite material in which a different type of material is dispersed in a base material, and an interval GI between one particle of the different type of material and another particle of the different type of material is the characteristic length $L_a$ of the microstructure.

The ceramic material according to [4], wherein let that the average of the intervals GI between one particle of the different type of material and another particle of the different type of material is $GI_{ave}$, the interval GI between one particle of the different type of material and another particle of the different type of material is $0.1\ GI_{ave}$ or more and $10\ GI_{ave}$ or less.

The ceramic material according to [5], wherein the base material includes SiC, and the particles of different type material include at least one type selected from the group consisting of O, B, C, N, Al, Si, and Y.

The ceramic material according to [5] or [6], wherein the base material includes SiC, and $GI_{ave}$ is from 10 to 500 nm.

The ceramic material according to any one of [1] to [3], wherein the ceramic material includes a porous body, and an interval PI between one pore and another pore in the porous body is the characteristic length $L_a$ of the micro-structure.

The ceramic material according to [8], wherein let that the average of the intervals PI between one pore and another pore is $PI_{ave}$, the interval PI between one pore and another pore is $0.1\ PI_{ave}$ or more and $10\ PI_{ave}$ or less.

The ceramic material according to [9], wherein the ceramic material is a porous body of SiC, and $PI_{ave}$ is from 10 to 500 nm.

The ceramic material according to any one of [1] to [3], wherein the ceramic material includes polycrystal and a particle size d of crystalline particles is the characteristic length $L_a$ of the micro-structure.

The ceramic material according to [11], wherein let that the average of the particle size d of crystalline particles is $d_{ave}$, the particle size d is $0.1\ d_{ave}$ or more and $10\ d_{ave}$ or less.

The ceramic material according to [12], wherein the ceramic material is a polycrystalline body of SiC, and $d_{ave}$ is from 10 to 500 nm.

A thermal switch, including the ceramic material according to any one of [1] to [13], and having thermal conductivity that changes with temperatures.

Effect of the Invention

A ceramic material of the present invention has low heat transfer performance at low temperatures and so has a heat insulation effect, and has high heat transfer performance at high temperatures and so has a heat dissipation effect.

Further, since a ceramic material of the present invention has heat transfer performance that changes with surrounding temperatures, it serves as an independent thermal switch, in which the heat transfer performance can switch between ON (high heat transfer performance) and OFF (low heat transfer performance) by itself. Accordingly there is no need to provide a component, such as a driving unit, and so the thermal switch can be made compact. Moreover, it is easy to be mounted, and has high degree of flexibility in shape.

MODE FOR CARRYING OUT THE INVENTION

Referring to the drawings, the following describes embodiments of the present invention. The present invention is not limited to the following embodiments, and is susceptible to various changes, modifications and improvements without deviating from the scope of the invention.

Figure 1A:
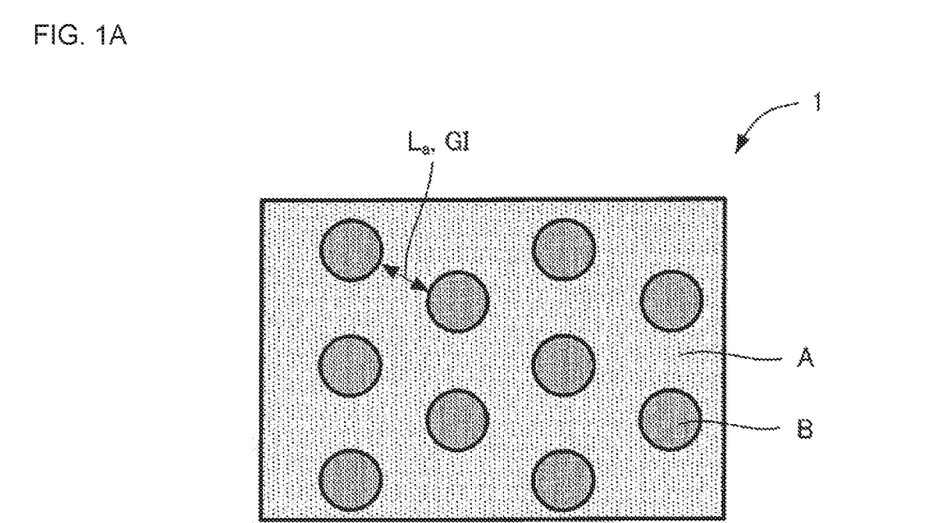
FIG. 1A schematically shows an embodiment of a ceramic material including a composite material in which a different type of material is dispersed in a base material.
Figure 1B:
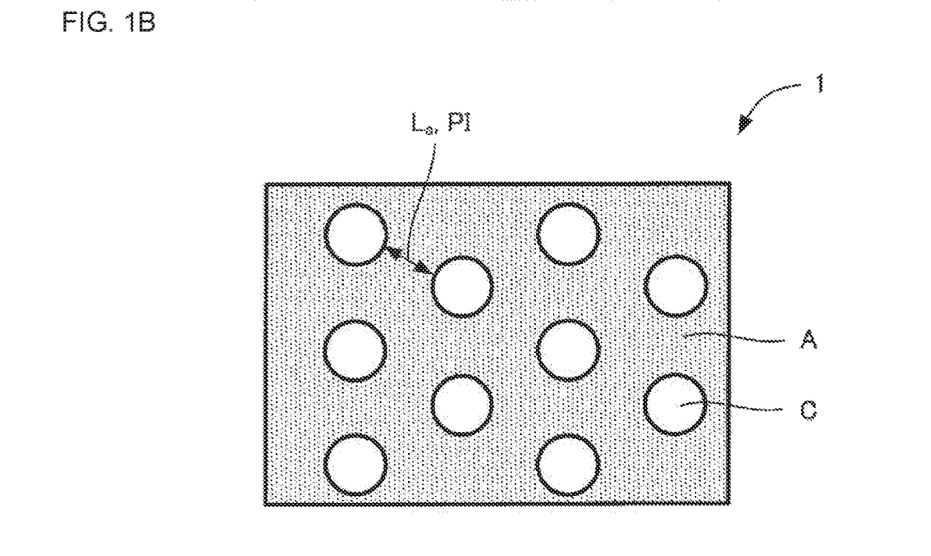
FIG. 1B schematically shows an embodiment of a ceramic material including a porous body.
Figure 1C:
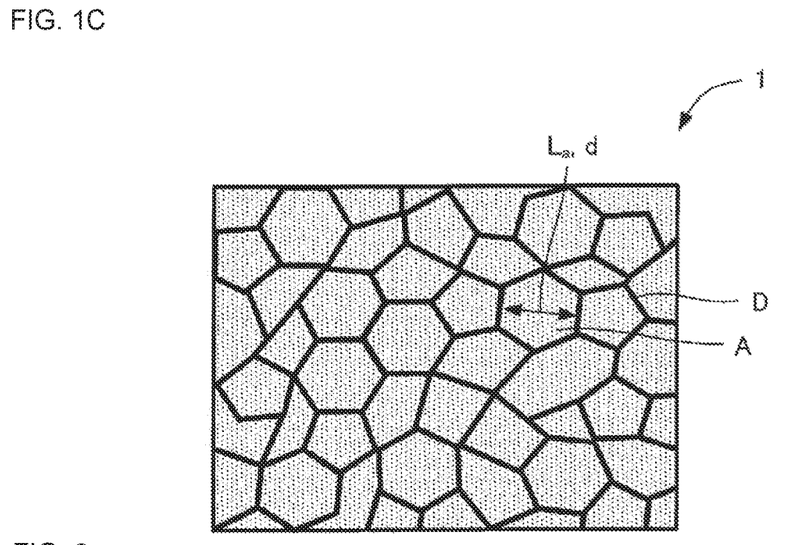
FIG. 1C schematically shows an embodiment of a ceramic material including polycrystal.

FIGS. 1A to 1C schematically show Embodiments 1 to 3 of a ceramic material of the present invention. Embodiment 1 in FIG. 1A shows a ceramic material including a composite material in which a different type of material is dispersed in a base material. Embodiment 2 in FIG. 1B shows a ceramic material including a porous body. Embodiment 3 in FIG. 1C shows a ceramic material including polycrystal.

The ceramic material of the present invention has a characteristic length $L_a$ of the micro-structure that is 0.1 $L_{AMFP} \leq L_a \leq 100\ L_{AMFP}$, and has thermal conductivity that monotonously increases from room temperature to 100° C., where the apparent mean free path ($L_{AMFP}$) of phonons at room temperature is specified as $L_{AMFP}$=(3×thermal conductivity)/(heat capacity×speed of sound) (Expression 1).

It is known that, based on the phonon gas model, thermal conductivity (κ) is represented as in the following expression 2 ("Phonon transport analysis of silicon crystal alloy by molecular dynamics method" Hori et al., the 49th National Heat Transfer Symposium in Japan, B-341 (2012-5)).

[Math. 1]

$$\kappa = \frac{1}{3} \sum_{k,s} C|V|\Lambda \quad \text{(Exp. 2)}$$

(C: specific heat of phonons, V: group velocity of phonons Λ: average free path of phonons, k: wavenumber, s: branching)

Based on Expression 2, the apparent mean free path ($L_{AMFP}$) of phonons is calculated as in Expression 1. Thermal conductivity, heat capacity and the speed of sound in the aforementioned Expression 1 to calculate the apparent mean free path of phonons are values of the monocrystalline base material making up the ceramic material at room temperature. The speed of sound is the speed of sound transmitting the monocrystals of the base material. That is, the ceramic material includes material A as the base material, and its apparent mean free path ($L_{AMFP}$) is calculated based on the thermal conductivity, heat capacity and speed of sound at room temperature when material A is single crystal.

When material A is SiC, $L_{AMFP}$ is 54 nm from Expression 1 [$L_{AMFP}$p=(3×thermal conductivity)/(heat capacity×speed of sound)]. For the calculation, the following values are used: thermal conductivity of SiC: 410 W/mK (reference: edited by the 124$^{th}$ committee on high-temperature ceramic materials, Japan Society for the Promotion of Science, "New SiC-based ceramic materials" (hereinafter the title of the book only is shown)), density: 3.21 g/cm$^3$ (reference: "New SiC-based ceramic materials"), specific heat: 690 J/gK (reference: "New SiC-based ceramic materials"), heat capacity 2,215 kJ/m$^3$K (calculated from density and specific heat described in reference: "New SiC-based ceramic materials"), and the speed of sound 10,360 m/s (reference: JP H8-149591 A).

When material A is AlN, $L_{AMFP}$ is 35 nm from Expression 1 [$L_{AMFP}$=(3×thermal conductivity)/(heat capacity×speed of sound)]. For the calculation, the following values are used: thermal conductivity of AlN: 170 W/mK (reference: WO 2013/061926), density: 3.26 g/cm$^3$ (reference: edited by the Ceramic Society of Japan "Ceramics Jiten (Ceramics Dictionary) Ver. 2" published by Maruzen Publishing, Japan), specific heat: 734 J/gK (reference: edited by the Chemical Society of Japan "Kagaku Binran Kiso-hen II (Handbook of Chemistry, basic II), Ver. 5" published by Maruzen Publishing, Japan), heat capacity 2,393 kJ/m$^3$K (calculated from the above density and specific heat), and the speed of sound 6,016 m/s (reference: WO 2013/061926).

When material A is Si$_3$N$_4$, $L_{AMFP}$ is 20 nm from Expression 1 [$L_{AMFP}$=(3×thermal conductivity)/(heat capacity× speed of sound)]. For the calculation, the following values are used: thermal conductivity of Si$_3$N$_4$: 180 W/mK (reference: edited by the 124$^{th}$ committee on advanced ceramics, Japan Society for the Promotion of Science, "New silicon nitride-based ceramic materials" (hereinafter the title of the book only is shown)), density: 3.19 g/cm$^3$ (reference: "New silicon nitride-based ceramic materials"), specific heat: 710 J/gK (reference: "New silicon nitride-based ceramic materials"), heat capacity 2,265 kJ/m$^3$K (calculated from the above density and specific heat), and the speed of sound 11,780 m/s (reference: JP H8-149591 A).

Thermal conduction is carried out by phonons and conduction electrons, and in the case of ceramic materials, phonons are dominant. Thermal conduction by phonons is affected by the structure having a length close to the free path of the phonons. When phonons have a free path longer than the length of the structure, less heat is transmitted because the phonons are scattered by the structure. When phonons have a short free path, heat can be transmitted because the phonons are not scattered by the structure. The length of the structure herein refers to the characteristic length $L_a$ of the micro-structure as stated above.

The characteristic length $L_a$ of the micro-structure is a typical length to represent the micro-structure of a ceramic material. For instance, in the case of a composite material in which a different type of material is dispersed in a base material, this is an interval between one particle of the different type of material and another particle of the different type of material, in the case of a porous body, this is an interval between one pore and another pore, and in the case of a polycrystalline body, this is a crystalline particle size (interval between one grain boundary and another grain boundary). Such a characteristic length $L_a$ of the micro-structure is set within the range of 0.1 $L_{AMFP} \leq L_a \leq 100\ L_{AMFP}$, whereby a material whose thermal conductivity can change greatly with temperatures can be obtained.

In the case of a material having a characteristic length $L_a$ of the micro-structure that is shorter than $L_{AMFP}$, more phonons are scattered by the micro-structure than those in a material having a characteristic length $L_a$ of the micro-structure that is larger than $L_{AMFP}$, and so the absolute value of thermal conductivity is smaller in the former case. Further, a material having a characteristic length $L_a$ of the micro-structure that is shorter than $L_{AMFP}$ greatly changes in thermal conductivity by phonons with temperatures, as compared with a material having a characteristic length $L_a$ of the micro-structure that is larger than $L_{AMFP}$, and so a difference between thermal conductivity at low temperatures and thermal conductivity at high temperatures is larger in the former case. Meanwhile, if the characteristic length $L_a$ of the micro-structure is smaller than 0.1 $L_{AMFP}$, the number of phonons that are scattered by the micro-structure becomes too large, meaning that thermal conductivity does not change with temperatures. Accordingly, when the characteristic length $L_a$ of the micro-structure is set short within the range of 0.1 $L_{AMFP} \leq L_a \leq 100\ L_{AMFP}$, then the degree of change in thermal conductivity with temperatures can be large, although the absolute value of thermal conductivity is small. On the other hand, when the absolute value of thermal conductivity is to be kept high, the range of 0.1 $L_{AMFP} \leq L_a \leq 100\ L_{AMFP}$ may be preferable.

In Embodiment 1 of FIG. 1A, particles of material B are present at a certain length of intervals in material A as the base material. In this embodiment, the characteristic length $L_a$ of the micro-structure is an interval between the particles of material B.

In Embodiment 2 of FIG. 1B, pores C are present at a certain length of intervals in material A as the base material. In this embodiment, the characteristic length $L_a$ of the micro-structure is an interval between the pores C.

In Embodiment 3 of FIG. 1C, material A as the base material is a polycrystalline body having a certain particle size, and has a grain boundary phase D. In this embodiment, the characteristic length $L_a$ of the micro-structure is the particle size.

In general, the free path of phonons has a distribution in the range of about 0.1 nm to 1 mm, and when the structure as stated above is in the nano-order (has a nano-structure), thermal conduction by phonons, which are longer than the length of structure, is suppressed. Accordingly, heat is transmitted only at about a few % to a few tens % of the thermal conductivity ($\kappa_{Low}$)$_{that}$ the material originally has at a certain temperature. Therefore thermal conductivity is in a low state (e.g., 0.2 $\kappa_{Low}$).

Meanwhile since phonons have a shorter free path at higher temperatures, the degree of suppressing thermal conduction due to the nano-structure becomes small at high temperatures. Therefore the thermal conductivity has a value (e.g., 0.8 $\kappa_{High}$) close to the thermal conductivity ($\kappa_{High}$) that the material originally has at the temperature.

Herein, the degree of suppressing thermal conduction (e.g., when thermal conductivity is 0.2 $\kappa_{Low}$ at low temperatures, the reason why thermal conductivity is 0.2) depends on the length of the structure (characteristic length $L_a$ of the micro-structure). Therefore this length of the structure is controlled appropriately while referring to the free path of phonons, whereby a thermal switch can be implemented, which is capable of switching the state where thermal conduction is suppressed at low temperatures (heat insulation state) and the state where thermal conduction is hardly suppressed at high temperatures (heat dissipation state).

The characteristic length $L_a$ of the micro-structure is set within a predetermined range, whereby a ceramic material whose thermal conductivity changes greatly with temperatures can be obtained. It is preferable for a thermal switch that a ceramic material therefor has thermal conductivity at 100° C. that is 1.5 times or more of the thermal conductivity at room temperature. It is preferable that a ceramic material has thermal conductivity at 200° C. that is 2 times or more of the thermal conductivity at room temperature.

Preferably the material may be all of the ceramics as long as thermal conduction by phonon conduction is dominant. Preferably such ceramics include silicon carbide, aluminum nitride, silicon nitride, alumina, yttria, magnesia, mullite, spinel, zirconia, cordierite, aluminum titanate and the like. Especially, materials, such as silicon carbide, aluminum nitride, and silicon nitride, are preferable because they have high thermal conductance and so have a large difference in thermal conductivity between the heat-dissipation state and the heat-insulation state.

The characteristic length $L_a$ of the micro-structure, which may vary with materials, is within the range of 1 nm to 1 µm, preferably 1 nm to 500 nm, and more preferably 10 to 100 nm. The following relationship holds generally, although it varies with materials. (1) 1 nm to 10 µm corresponds to 0.1 $L_{AMFP} \leq L_a \leq 100\ L_{AMFP}$. (2) 1 to 500 nm corresponds to 0.1 $L_{AMFP} \leq L_a \leq 20\ L_{AMFP}$. (3) 10 to 100 nm corresponds to 0.3 $L_{AMFP} \leq L_a \leq 3\ L_{AMFP}$.

Since more phonons (phonons having a long mean free path) are scattered in (2) 1 to 500 nm than in (1) 1 nm to 10 µm, thermal conduction by phonons is suppressed at low temperatures in (2) than in (1), so that thermal conductivity becomes lower, and thermal conductivity becomes smaller in (2) than in (1) at high temperatures as well. However, since the degree of suppressing thermal conduction becomes smaller at high temperatures due to the micro-structure (nano-structure), the degree of changing in thermal conductivity can be made larger in (2) than in (1), and so (2) in which the upper limit is limited is preferable. For instance, whereas the thermal conductivity is 0.2 $\kappa_{Low}$ at low temperatures and 0.8 $\kappa_{High}$ at high temperatures in (1), the thermal conductivity is 0.1 $\kappa_{Low}$ at low temperatures and 0.75 $\kappa_{High}$ at high temperatures in (2). In this way, the degree of changing in thermal conductivity is larger in (2).

Further, in (3) 10 to 100 nm, the lower limit also is limited, which can prevent the absolute value of thermal conductivity from being too small.

As the technique to control the micro-structure, the following four ways (1) to (4) are available, for example. They may be combined as needed:

(1) In material A (base material), a material different from the base material is dispersed at the intervals of the characteristic length $L_a$ of the micro-structure, which is then sintered (FIG. 1A, Embodiment 1);

(2) In material A (base material), a material different from the base material is precipitated at the intervals of the characteristic length $L_a$ of the micro-structure (FIG. 1A, Embodiment 1);

(3) In material A (base material), pores are formed at the intervals of the characteristic length $L_a$ of the micro-structure (FIG. 1B, Embodiment 2); and (4) A polycrystalline body is made up of particles of material A whose particle size is the characteristic length $L_a$ of the micro-structure (grain boundary phase is present at the intervals of the characteristic length $L_a$ of the micro-structure) (FIG. 1C, Embodiment 3).

Further descriptions are given below for Embodiments 1 to 3.

(Embodiment 1)

FIG. 1A shows Embodiment 1 that includes a composite material in which a different type of material (material B) is dispersed in a base material (material A). In this embodiment, particles of material B are present in material A at the intervals of a certain length. The characteristic length $L_a$ of a micro-structure is an interval between one particle of material B and another particle of material B. For one particle $B_1$, another particle $B_2$, which is located at the closest position among the surrounding particles $B_i$, is selected, and the distance between $B_1$ and $B_2$ is GI.

Let that the interval between one particle of the different type of material and another particle of the different type of material (interval between one particle of material B and another particle of material B) is GI, GI is the characteristic length $L_a$ of the micro-structure. Therefore, $0.1 L_{AMFP} \leq GI \leq 100 L_{AMFP}$ is preferable. That is, even when there is a distribution in the intervals between one particle of the different type of material and another particle of the different type of material (when the intervals are not constant), GI is preferably within this range, and 80% or more of GI as a whole is preferably within this range. A ceramic material is formed so that the interval GI between one particle of the different type of material and another particle of the different type of material is within such a range, whereby the ceramic material obtained can have thermal conductivity that changes greatly with temperatures.

For a larger change in thermal conductivity, $0.1 L_{AMFP} \leq GI < L_{AMFP}$ is preferable. In this case, however, the absolute value of the thermal conductivity may become too low. Therefore, although $0.1 L_{AMFP} \leq GI \leq 100 L_{AMFP}$ is more preferable for a larger change in thermal conductivity, $L_{AMFP} \leq GI \leq 100 L_{AMFP}$ may be more preferable in some cases to keep the absolute value of thermal conductivity high.

Let that the average of the intervals GI between one particle of the different type of material and another particle of the different type of material is $GI_{ave}$, the interval GI between one particle of the different type of material and another particle of the different type of material preferably is $0.1 GI_{ave}$ or more and $10 GI_{ave}$ or less. A ceramic material is formed so that the interval GI between one particle of the different type of material and another particle of the different type of material is within such a range, whereby the ceramic material obtained can have thermal conductivity that changes greatly with temperatures.

The base material (material A) of the ceramic material as in Embodiment 1 includes SiC. The particles of different type material (material B) includes at least one type selected from the group consisting of O, B, C, N, Al, Si, and Y, and specifically includes $SiO_2$, $Al_2O_3$ and the like. Further for the advantageous effects to be obtained, the ceramic material is formed so that the volume percent of material B is less than that of material A. Moreover when the base material (material A) is SiC, $GI_{ave}$ is preferably from 10 to 500 nm.

Raw material powder of a predetermined particle size is fired under a predetermined firing condition, whereby a ceramic material as Embodiment 1 having the controlled interval GI between one particle of the different type of material and another particle of the different type of material can be obtained. Further, raw material powder may be dispersed by dispersing agent to be disentangled to primary particles, which may be press molded and fired, whereby the interval GI between one particle of the different type of material and another particle of the different type of material after sintering has less variation.

(Embodiment 2)

FIG. 1B shows one embodiment of a ceramic material including a porous body. The present embodiment has a structure in which pores C are present at a certain length of intervals in material A. The characteristic length $L_a$ of the micro-structure is the length of structure that is the interval between pores C.

Let that the interval between one pore C and another pore C in the porous body is PI, then PI is the characteristic length $L_a$ of the micro-structure. For one pore $C_1$, another pore $C_2$, which is located at the closest position among the surrounding pores $C_i$, is selected, and the distance between $C_1$ and $C_2$ is PT. $0.1 L_{AMFP} \leq PI \leq 100 L_{AMFP}$ is preferable. Even when there is a distribution in the intervals of one pore C and another pore C (when the intervals are not constant), PI is preferably within this range, and 80% or more of PI as a whole is preferably within this range. A ceramic material is formed so that the interval PI between one pore C and another pore C in the porous body is within such a range, whereby the ceramic material obtained can have thermal conductivity that changes greatly with temperatures.

For a larger change in thermal conductivity, $0.1 L_{AMFP} \leq PI < L_{AMFP}$ is preferable. In this case, however, the absolute value of the thermal conductivity may become too low. Therefore, although $0.1 L_{AMFP} \leq PI \leq 100 L_{AMFP}$ is more preferable for a larger change in thermal conductivity, $L_{AMFP} < PI < 100 L_{AMFP}$ may be more preferable in some cases when the absolute value of thermal conductivity is to be kept high.

Let that the average of the intervals PI between one pore C and another pore C is $PI_{ave}$, the interval PI between one pore C and another pore C preferably is $0.1 PI_{ave}$ or more and $10 PI_{ave}$ or less. A ceramic material is formed so that the interval PI between one pore C and another pore C is within such a range, whereby the ceramic material obtained can have thermal conductivity that changes greatly with temperatures.

The ceramic material as in Embodiment 2 includes a porous body of SiC. In this case, $PI_{ave}$ is preferably from 10 to 500 nm. Such a range of $PI_{ave}$ allows the porous body to function as a thermal switch at around room temperature.

Raw material powder of a predetermined particle size is fired under a predetermined firing condition, whereby a ceramic material as Embodiment 2 having the controlled interval PI between pores can be obtained. Further, raw material powder may be dispersed by dispersing agent to be disentangled to primary particles, which may be press molded and fired, whereby the interval PI between pores after sintering has less variation.

(Embodiment 3)

FIG. 1C shows one embodiment of a ceramic material including polycrystal. The present embodiment includes polycrystal and the particle size d of crystalline particles is the characteristic length $L_a$ of the micro-structure. Therefore $0.1 L_{AMFP} \leq d \leq 100 L_{AMFP}$ is preferable. Even when there is a distribution in the particle size d (when the intervals are not constant), d is preferably within this range, and 80% or more of d as a whole is preferably within this range. A ceramic material is formed so that the particle size d of crystalline particles is within such a range, whereby the ceramic material obtained can have thermal conductivity that changes greatly with temperatures.

For a larger change in thermal conductivity, $0.1 L_{AMFP} \leq d \leq L_{AMFP}$ is preferable. In this case, however, the absolute value of the thermal conductivity may become too low.

Therefore, although 0.1 $L_{AMFP} \leq d \leq 100\ L_{AMFP}$ is more preferable for a larger change in thermal conductivity, $L_{AMFP} \leq d \leq 100\ L_{AMFP}$ may be more preferable in some cases to keep the absolute value of thermal conductivity high.

Let that the average of the particle size d of crystalline particles is $d_{ave}$, the particle size d preferably is 0.1 $d_{ave}$ or more and 10 $d_{ave}$ or less. A ceramic material is formed so that the average $d_{ave}$ of the particle size d is within such a range, whereby the ceramic material obtained can have thermal conductivity that changes greatly with temperatures. The ceramic material as in Embodiment 3 includes a polycrystalline body of SiC. In this case, $d_{ave}$ is preferably from 10 to 500 nm. Such a range of $d_{ave}$ allows the polycrystalline body to function as a thermal switch at around room temperature.

Raw material powder of a predetermined particle size is fired under a predetermined firing condition, whereby a ceramic material as Embodiment 3 having the controlled particle size d of crystalline particles can be obtained.

(Thermal Switch)

Figure 2:
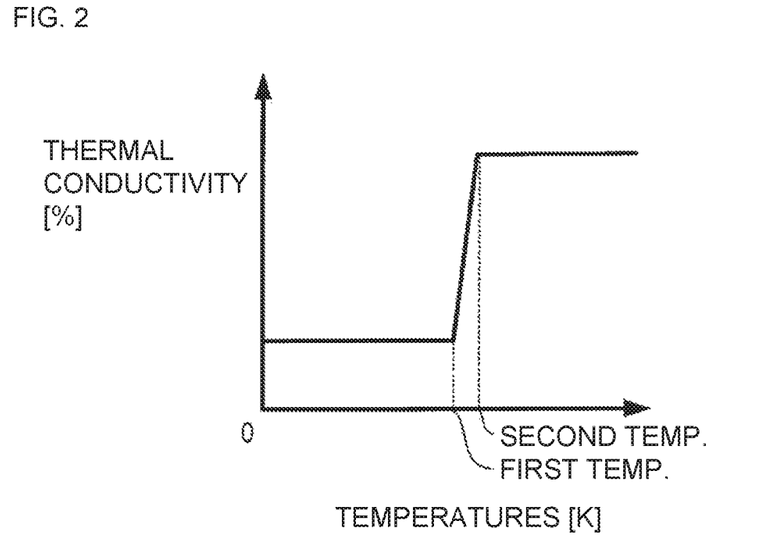
FIG. 2 shows a change of thermal conductivity with temperatures of a ceramic material.

Since ceramic materials as stated above have thermal conductivity that changes greatly with temperatures, they can be used as a thermal switch. For instance, as shown in FIG. 2, thermal conductivity of these ceramic materials increases suddenly after a certain temperature of room temperature or higher. A thermal switch is a material that can switch between a low thermal conductivity state (heat insulation state) and a high thermal conductivity state (heat transfer state). In the case of a thermal switch whose thermal conductivity increases with temperatures, since it has low thermal conductivity at a certain temperature (first temperature) or lower, the thermal switch can be said in an OFF state. Meanwhile at a second temperature higher than the first temperature, the thermal conductivity becomes high, and so the thermal switch can be said in an ON state.

When a thermal switch of the present invention is provided around a heat generation source from which heat is generated, a temperature regulation structure can be formed. A temperature regulation structure refers to a structure that effectively uses heat from a heat generation source while regulating the temperature. A heat generation source from which heat is generated is a structure to generate heat, which is not limited especially. The temperature regulation structure changes a heat dissipation state between a first temperature and a second temperature that is higher or lower than that so as to regulate the temperature due to heat from the heat generation source, whereby the performance of a system including such a temperature regulation structure can be improved. Specifically, examples of the heat generation source include a battery pack, a motor, a CPU, a control circuit, an engine, a brake, and a gear box. The structure including a thermal switch around them is a temperature regulation structure. When the heat generation source is sunlight, a thermal switch may be provided at a building material, a window or a sash, whereby an indoor temperature regulation structure can be formed.

In order to reduce resistance during inflow and outflow of heat at the inflow face of heat and at the outflow face of heat of a thermal switch, the following structures (1) and (2) also are preferable. (1) When the inflow face of heat and the outflow face of heat come into contact with fluid such as gas or liquid, irregularity may be provided on the surface to increase the surface area for better heat transfer. (2) When the inflow face of heat and the outflow face of heat come into contact with solid, every interface may be flat and smooth to reduce thermal resistance, or heat conductive grease or the like may be inserted or bonded at the interface.

EXAMPLES

The following describes the present invention by way of examples in more details, and the present invention is not limited to these examples.

Example 1

In order to obtain a formed body with less variation in pore intervals and with less variation in pore intervals after sintering as well, silicon carbide powder with the average particle size of 100 nm was dispersed with ethanol containing dispersing agent. This silicon carbide powder was press-molded to prepare a formed body of a disk shape of 30 mm in diameter and 6 mm in thickness. This formed body was fired at 2,050° C. in the Ar atmosphere to obtain a porous silicon carbide sintered body.

This sintered body was observed with an electronic microscope, and values about silicon carbide particles and pores making up thereof were measured based on the image. The average of particle sizes of 10 silicon carbide particles selected at random was 100 nm. When the interval between one of 10 pores selected at random and another pore closest to the pore among the surrounding pores was measured, then the average thereof was 100 nm. As described above, using the value of thermal conductivity of SiC: 410 W/mK (reference: edited by the 124th committee on high-temperature ceramic materials, Japan Society for the Promotion of Science, "New SiC-based ceramic materials"), density: 3.21 g/cm$^3$ (reference: "New SiC-based ceramic materials"), specific heat: 690 J/gK (reference: "New SiC-based ceramic materials"), heat capacity 2,215 kJ/m$^3$K (calculated from density and specific heat described in reference: "New SiC-based ceramic materials"), and the speed of sound 10,360 m/s (reference: JP H8-149591 A), $L_{AMFP}$ is 54 nm based on $L_{AMFP}$=(3×thermal conductivity)/(heat capacity× speed of sound) when the material is SiC. That is, phonons of SiC have the average free path of 54 nm, and it was confirmed that the intervals between pores were 0.1 time or more and 100 times or less of the average free path of phonons.

When thermal conductivity of this sintered body was measured, then it was 5 W/(m·K) at room temperature and 10 W/(m·K) at 200° C. Table 1 shows the result. This shows that this sintered body can function as a thermal switch that has a heat insulation state at room temperature and has a heat dissipation state at high temperatures.

Example 2

Silicon carbide powder with the average particle size of 20 nm was press-molded to prepare a formed body of a disk shape of 30 mm in diameter and 6 mm in thickness. This formed body was fired by spark plasma sintering (SPS) (1,400° C. for 10 minutes) to obtain a porous silicon carbide sintered body.

This sintered body was observed with an electronic microscope, and values about silicon carbide particles and pores making up thereof were measured based on the image. The average of particle sizes of 10 silicon carbide particles selected at random was 30 nm. When the interval between one of 10 pores selected at random and another pore closest to the pore among the surrounding pores was measured, then the average thereof was 30 nm. Since phonons of SiC have the average free path of 54 nm, it was confirmed that the intervals between pores were 0.1 time or more and 100 times or less of the average free path of phonons.

When thermal conductivity of this sintered body was measured, then it was 4.1 W/(m·K) at room temperature (25° C.), 6.6 W/(m·K) at 100° C. and 9.5 W/(m·K) at 200° C., and so it was confirmed that the thermal conductivity increased from room temperature (25° C.) to 100° C. Table 1 shows the result. This shows that the thermal conductivity at 100° C. was 1.5 times or more of the thermal conductivity at room temperature, and the thermal conductivity at 200° C. was 2 times or more of the thermal conductivity at room temperature.

Example 3

A formed body was prepared similarly to Example 2, and the formed body was fired by spark plasma sintering (SPS) (1,400° C. for 30 minutes) to obtain a porous silicon carbide sintered body.

This sintered body was observed with an electronic microscope, and values about silicon carbide particles and pores making up thereof were measured based on the image. The average of particle sizes of 10 silicon carbide particles selected at random was 52 nm. When the interval between one of 10 pores selected at random and another pore closest to the pore among the surrounding pores was measured, then the average thereof was 55 nm. Since phonons of SiC have the average free path of 54 nm, it was confirmed that the intervals between pores were 0.1 time or more and 100 times or less of the average free path of phonons.

When thermal conductivity of this sintered body was measured, then it was 7.8 W/(m·K) at room temperature (25° C.), 12 W/(m·K) at 100° C. and 16 W/(m·K) at 200° C., and so it was confirmed that the thermal conductivity increased from room temperature (25° C.) to 100° C. Table 1 shows the result. The thermal conductivity at 100° C. was 1.5 times or more of the thermal conductivity at room temperature, and the thermal conductivity at 200° C. was 2 times or more of the thermal conductivity at room temperature.

Example 4

A formed body was prepared similarly to Example 2, and the formed body was fired by spark plasma sintering (SPS) (1,500° C. for 10 minutes) to obtain a porous silicon carbide sintered body.

This sintered body was observed with an electronic microscope, and values about silicon carbide particles and pores making up thereof were measured based on the image. The average of particle sizes of 10 silicon carbide particles selected at random was 95 nm. When the interval between one of 10 pores selected at random and another pore closest to the pore among the surrounding pores was measured, then the average thereof was 98 nm. Since phonons of SiC have the average free path of 54 nm, it was confirmed that the intervals between pores were 0.1 time or more and 100 times or less of the average free path of phonons.

When thermal conductivity of this sintered body was measured, then it was 13 W/(m·K) at room temperature (25° C.), 20 W/(m·K) at 100° C. and 28 W/(m·K) at 200° C., and so it was confirmed that the thermal conductivity increased from room temperature (25° C.) to 100° C. Table 1 shows the result. The thermal conductivity at 100° C. was 1.5 times or more of the thermal conductivity at room temperature, and the thermal conductivity at 200° C. was 2 times or more of the thermal conductivity at room temperature.

Example 5

A formed body was prepared similarly to Example 2, and the formed body was fired in the Ar atmosphere (1,400° C. for 2 hours) to obtain a porous silicon carbide sintered body.

This sintered body was observed with an electronic microscope, and values about silicon carbide particles and pores making up thereof were measured based on the image. The average of particle sizes of 10 silicon carbide particles selected at random was 23 nm. When the interval between one of 10 pores selected at random and another pore closest to the pore among the surrounding pores was measured, then the average thereof was 25 nm. Since phonons of SiC have the average free path of 54 nm, it was confirmed that the intervals between pores were 0.1 time or more and 100 times or less of the average free path of phonons.

When thermal conductivity of this sintered body was measured, then it was 0.61 W/(m·K) at room temperature (25° C.), 0.99 W/(m·K) at 100° C. and 1.4 W/(m·K) at 200° C., and so it was confirmed that the thermal conductivity increased from room temperature (25° C.) to 100° C. Table 1 shows the result. The thermal conductivity at 100° C. was 1.5 times or more of the thermal conductivity at room temperature, and the thermal conductivity at 200° C. was 2 times or more of the thermal conductivity at room temperature.

Example 6

A formed body was prepared similarly to Example 2, and the formed body was fired in a vacuum (1,400° C. for 2 hours) to obtain a porous silicon carbide sintered body.

This sintered body was observed with an electronic microscope, and values about silicon carbide particles and pores making up thereof were measured based on the image. The average of particle sizes of 10 silicon carbide particles selected at random was 22 nm. When the interval between one of 10 pores selected at random and another pore closest to the pore among the surrounding pores was measured, then the average thereof was 26 nm. Since phonons of SiC have the average free path of 54 nm, it was confirmed that the intervals between pores were 0.1 time or more and 100 times or less of the average free path of phonons.

When thermal conductivity of this sintered body was measured, then it was 0.53 W/(m·K) at room temperature (25° C.), 0.85 W/(m·K) at 100° C. and 1.2 W/(m·K) at 200° C., and so it was confirmed that the thermal conductivity increased from room temperature (25° C.) to 100° C. Table 1 shows the result. The thermal conductivity at 100° C. was 1.5 times or more of the thermal conductivity at room temperature, and the thermal conductivity at 200° C. was 2 times or more of the thermal conductivity at room temperature.

Example 7

A formed body was prepared similarly to Example 2, and the formed body was fired by hot pressing (1,400° C. for 1 hour) to obtain a porous silicon carbide sintered body.

This sintered body was observed with an electronic microscope, and values about silicon carbide particles and pores making up thereof were measured based on the image. The average of particle sizes of 10 silicon carbide particles selected at random was 57 nm. When the interval between one of 10 pores selected at random and another pore closest to the pore among the surrounding pores was measured, then the average thereof was 63 nm. Since phonons of SiC have the average free path of 54 nm, it was confirmed that the intervals between pores were 0.1 time or more and 100 times or less of the average free path of phonons.

When thermal conductivity of this sintered body was measured, then it was 8.2 W/(m·K) at room temperature (25°

C.), 12 W/(m·K) at 100° C. and 17 W/(m·K) at 200° C., and so it was confirmed that the thermal conductivity increased from room temperature (25° C.) to 100° C. Table 1 shows the result. The thermal conductivity at 100° C. was 1.5 times or more of the thermal conductivity at room temperature, and the thermal conductivity at 200° C. was 2 times or more of the thermal conductivity at room temperature.

TABLE 1

|  | Firing method | Pore interval nm | Thermal conductivity at room temperature W/(m · K) | Thermal conductivity at 100° C. W/(m · K) | Thermal conductivity at 200° C. W/(m · K) |
| --- | --- | --- | --- | --- | --- |
| Ex. 1 | Ar 2050° C. | 100 | 5 | — | 10 |
| Ex. 2 | SPS 1400° C., 10 min | 30 | 4.1 | 6.6 | 9.5 |
| Ex. 3 | SPS 1400° C., 30 min | 55 | 7.8 | 12 | 16 |
| Ex. 4 | SPS 1500° C., 10 min | 98 | 13 | 20 | 28 |
| Ex. 5 | Ar 1400° C., 2 h | 25 | 0.61 | 0.99 | 1.4 |
| Ex. 6 | Vacuum 1400° C., 2 h | 26 | 0.53 | 0.85 | 1.2 |
| Ex. 7 | Hotpress 1400° C., 1 h | 57 | 8.2 | 12 | 17 |

Example 8

To silicon carbide powder with the average particle size of 20 nm, 5 mass % of $Y_2O_3$ and 5 mass % of $Al_2O_3$ were added as sintering aid to prepare mixture powder, which was then press-molded to prepare a formed body of a disk shape of 30 mm in diameter and 6 mm in thickness. This formed body was fired in the Ar atmosphere at 2,000° C. to obtain a dense silicon carbide sintered body.

When this sintered body was observed with an electronic microscope, a phase containing Al, Y and O as particles of different type of material in addition to SiC was observed. Values about these particles of different type of material were measured based on the electronic microscope image. For 10 particles of different type of material selected at random, one particle of different type of material was selected, and the interval between this particle and another particle of different type closest to it was measured, then the average thereof was 60 nm. Since phonons of SiC have the average free path of 54 nm, it was confirmed that the intervals between particles of different type of material were 0.1 time or more and 100 times or less of the average free path of phonons.

When thermal conductivity of this sintered body was measured, then it was 18 W/(m·K) at room temperature (25° C.), 28 W/(m·K) at 100° C. and 38 W/(m·K) at 200° C., and so it was confirmed that the thermal conductivity increased from room temperature (25° C.) to 100° C. The thermal conductivity at 100° C. was 1.5 times or more of the thermal conductivity at room temperature, and the thermal conductivity at 200° C. was 2 times or more of the thermal conductivity at room temperature.

Example 9

To silicon carbide powder with the average particle size of 20 nm, 5 mass % of $SrCO_3$ and 5 mass % of $Al_2O_3$ were added to prepare mixture powder, which was then press-molded to prepare a formed body of a disk shape of 30 mm in diameter and 6 mm in thickness. This formed body was fired in the Ar atmosphere at 1,500° C. to obtain a dense silicon carbide sintered body.

When this sintered body was observed with an electronic microscope, this was observed as a polycrystalline body having SiC and a grain boundary phase including Sr, Al, Si and O surrounding SiC. Values about these SiC particles were measured based on the electronic microscope image. When the particle sizes of 10SiC particles selected at random were measured, their average was 35 nm. Since phonons of SiC have the average free path of 54 nm, it was confirmed that the particle size was 0.1 time or more and 100 times or less of the average free path of phonons.

When thermal conductivity of this sintered body was measured, then it was 2.5 W/(m·K) at room temperature (25° C.), 4.2 W/(m·K) at 100° C. and 5.8 W/(m·K) at 200° C., and so it was confirmed that the thermal conductivity increased from room temperature (25° C.) to 100° C. The thermal conductivity at 100° C. was 1.5 times or more of the thermal conductivity at room temperature, and the thermal conductivity at 200° C. was 2 times or more of the thermal conductivity at room temperature.

Example 10

Silicon carbide powder with the average particle size of 20 nm was press-molded to prepare a formed body of a disk shape of 30 mm in diameter and 6 mm in thickness. This formed body was fired in the atmosphere at 1,500° C. to obtain a dense silicon carbide sintered body.

When this sintered body was observed with an electronic microscope, this was observed as a polycrystalline body having SiC and a grain boundary phase including Si and O surrounding SiC. Values about these SiC particles were measured based on the electronic microscope image. When the particle sizes of 10 SiC particles selected at random were measured, their average was 30 nm. Since phonons of SiC have the average free path of 54 nm, it was confirmed that the particle size was 0.1 time or more and 100 times or less of the average free path of phonons.

When thermal conductivity of this sintered body was measured, then it was 2.2 W/(m·K) at room temperature (25° C.), 3.5 W/(m·K) at 100° C. and 5.3 W/(m·K) at 200° C., and so it was confirmed that the thermal conductivity increased from room temperature (25° C.) to 100° C. The thermal conductivity at 100° C. was 1.5 times or more of the thermal conductivity at room temperature, and the thermal conductivity at 200° C. was 2 times or more of the thermal conductivity at room temperature.

Example 11

Aluminum nitride powder with the average particle size of 40 nm was press-molded to prepare a formed body of a disk shape of 30 mm in diameter and 6 mm in thickness. This formed body was fired in the nitrogen atmosphere at 1,400° C. to obtain a porous aluminum nitride sintered body.

This sintered body was observed with an electronic microscope, and values about aluminum nitride particles and pores making up thereof were measured based on the image. The average of particle sizes of 10 aluminum nitride particles selected at random was 50 nm. When the interval between one of 10 pores selected at random and another pore closest to the pore among the surrounding pores was measured, then the average thereof was 55 nm. As described above, using the value of thermal conductivity of AlN: 170 W/mK (reference: WO 2013/061926), density: 3.26 g/cm³ (reference: edited by the Ceramic Society of Japan "Ceramics Jiten (Ceramics Dictionary) Ver. 2" published by Maruzen Publishing, Japan), specific heat: 734 J/gK (reference: edited by the Chemical Society of Japan "Kagaku Binran Kiso-hen II (Handbook of Chemistry, basic II), Ver. 5" published by Maruzen Publishing, Japan), heat capacity 2,393 kJ/m³K (calculated from the above density and specific heat), and the speed of sound 6,016 m/s (reference: WO 2013/061926), $L_{AMFP}$ is 35 nm based on $L_{AMFP}$=(3×thermal conductivity)/(heat capacity×speed of sound) when the material is AlN. That is, phonons of AlN have the average free path of 35 nm, and it was confirmed that the intervals between pores were 0.1 time or more and 100 times or less of the average free path of phonons.

When thermal conductivity of this sintered body was measured, then it was 2 W/(m·K) at room temperature (25° C.), 3 W/(m·K) at 100° C. and 4 W/(m·K) at 200° C., and so it was confirmed that the thermal conductivity increased from room temperature (25° C.) to 100° C. The thermal conductivity at 100° C. was 1.5 times or more of the thermal conductivity at room temperature, and the thermal conductivity at 200° C. was 2 times or more of the thermal conductivity at room temperature.

Example 12

Silicon nitride powder with the average particle size of 25 nm was press-molded to prepare a formed body of a disk shape of 30 mm in diameter and 6 mm in thickness. This formed body was fired in the nitrogen atmosphere at 1,400° C. to obtain a porous silicon nitride sintered body.

This sintered body was observed with an electronic microscope, and values about silicon nitride particles and pores making up thereof were measured based on the image. The average of particle sizes of 10 silicon nitride particles selected at random was 30 nm When the interval between one of 10 pores selected at random and another pore closest to the pore among the surrounding pores was measured, then the average thereof was 30 nm. As described above, using the value of thermal conductivity of $Si_3N_4$: 180 W/mK (reference: edited by the 124$^{th}$ committee on advanced ceramics, Japan Society for the Promotion of Science, "New silicon nitride-based ceramic materials"), density: 3.19 g/cm³ (reference: "New silicon nitride-based ceramic materials"), specific heat: 710 J/gK (reference: "New silicon nitride-based ceramic materials"), heat capacity 2,265 kJ/m³K (calculated from the above density and specific heat), and the speed of sound 11,780 m/s (reference: JP H8-149591 A), $L_{AMFP}$ is 20 nm based on $L_{AMFP}$=(3×thermal conductivity)/(heat capacity×speed of sound) when the material is $Si_3N_4$. That is, phonons of $Si_3N_4$ have the average free path of 20 nm, and it was confirmed that the intervals between pores were 0.1 time or more and 100 times or less of the average free path of phonons.

When thermal conductivity of this sintered body was measured, then it was 2.2 W/(m·K) at room temperature (25° C.), 3.3 W/(m·K) at 100° C. and 4.5 W/(m·K) at 200° C., and so it was confirmed that the thermal conductivity increased from room temperature (25° C.) to 100° C. The thermal conductivity at 100° C. was 1.5 times or more of the thermal conductivity at room temperature, and the thermal conductivity at 200° C. was 2 times or more of the thermal conductivity at room temperature.

Comparative Example 1

Silicon carbide powder with the average particle size of 10 μm was press-molded to prepare a formed body of a disk shape of 30 mm in diameter and 6 mm in thickness. This formed body was fired in the Ar atmosphere at 2,200° C. to obtain a porous silicon carbide sintered body.

Similarly to Example 1, the particle size of the silicon carbide particles and the intervals of pores were obtained. This sintered body was made up of silicon carbide particles of about 10 μm, and the pores were disposed at the intervals of about 10 μm.

When thermal conductivity of this sintered body was measured, then it was 45 W/(m·K) at room temperature and 40 W/(m·K) at 200° C. In this way, this sintered body did not function as a thermal switch that switches between a heat insulation state and a heat dissipation state.

TABLE 2

| | Firing method | Interval | nm | Thermal conductivity at room temperature W/(m · K) | Thermal conductivity at 100° C. W/(m · K) | Thermal conductivity at 200° C. W/(m · K) |
|---|---|---|---|---|---|---|
| Ex. 8 | Ar 2000° C. | Interval in different type material | 60 | 18 | 28 | 38 |
| Ex. 9 | Ar 1500° C. | particle size | 35 | 2.5 | 4.2 | 5.8 |
| Ex. 10 | Air 1500° C. | particle size | 30 | 2.2 | 3.5 | 5.3 |
| Ex. 11 | Nitrogen 1400° C. | Interval between pores | 55 | 2 | 3 | 4 |
| Ex. 12 | Nitrogen 1400° C. | Interval between pores | 30 | 2.2 | 3.3 | 4.5 |
| Comp. Ex. 1 | Ar 2200° C. | Interval between pores | 10000 (10 μm) | 45 | — | 40 |

As shown in Tables 1 and 2, thermal conductivity of Examples 1 to 12 changed greatly with temperatures.

INDUSTRIAL APPLICABILITY

The thermal switch of the present invention can be used as a switch whose degree to transmit heat changes with temperatures.

DESCRIPTION OF REFERENCE NUMERALS

1: Ceramic material

The invention claimed is:

1. A reversible thermal switch comprising a ceramic material, said ceramic material having a characteristic length $L_a$ of a micro-structure thereof that satisfies $0.1L_{AMFP} \leq L_a \leq 100L_{AMFP}$, and having thermal conductivity that monotonously increases from room temperature to 100° C., where $L_{AMFP}$ denotes apparent mean free path of phonons at room temperature, and is defined as $L_{AMFP}=(3\times$ thermal conductivity$)/($heat capacity$\times$speed of sound$)$, wherein the thermal switch has a thermal conductivity that changes with temperature.

2. The reversible thermal switch according to claim 1, wherein thermal conductivity thereof at 100° C. is 1.5 times or more of thermal conductivity at room temperature.

3. The reversible thermal switch according to claim 1, wherein thermal conductivity thereof at 200° C. is 2 times or more of thermal conductivity at room temperature.

4. The reversible thermal switch according to claim 1, wherein the ceramic material includes a composite material in which a different type of material is dispersed in a base material, and an interval GI between one particle of the different type of material and another particle of the different type of material is the characteristic length $L_a$ of the micro-structure.

5. The reversible thermal switch according to claim 4, wherein let that the average of the intervals GI between one particle of the different type of material and another particle of the different type of material is $GI_{ave}$, the interval GI between one particle of the different type of material and another particle of the different type of material is $0.1GI_{ave}$ or more and $10GI_{ave}$ or less.

6. The reversible thermal switch according to claim 5, wherein the base material includes SiC, and the particles of different type material include at least one type selected from the group consisting of O, B, C, N, Al, Si, and Y.

7. The reversible thermal switch according to claim 5, wherein the base material includes SiC, and $GI_{ave}$ is from 10 to 500 nm.

8. The reversible thermal switch according to claim 1, wherein the ceramic material includes a porous body, and an interval PI between one pore and another pore in the porous body is the characteristic length $L_a$ of the micro-tructure.

9. The reversible thermal switch according to claim 8, wherein let that the average of the intervals PI between one pore and another pore is $PI_{ave}$, the interval PI between one pore and another pore is $0.1PI_{ave}$ or more and $10PI_{ave}$ or less.

10. The reversible thermal switch according to claim 9, wherein the ceramic material is a porous body of SiC, and $PI_{ave}$ is from 10 to 500 nm.

11. The ceramic material reversible thermal switch according to claim 1, wherein the ceramic material includes polycrystal and a particle size d of crystalline particles is the characteristic length $L_a$ of the micro-structure.

12. The reversible thermal switch according to claim 11, wherein let that the average of the particle size d of crystalline particles is $d_{ave}$, the particle size d is $0.1d_{ave}$ or more and $10d_{ave}$ or less.

13. The reversible thermal switch according to claim 12, wherein the ceramic material is a polycrystalline body of SiC, and $d_{ave}$ is from 10 to 500 nm.

* * * * *